United States Patent
Yang et al.

(10) Patent No.: US 10,600,185 B2
(45) Date of Patent: Mar. 24, 2020

(54) AUTOMATIC LIVER SEGMENTATION USING ADVERSARIAL IMAGE-TO-IMAGE NETWORK

(71) Applicant: Siemens Healthcare GmbH, Erlangen (DE)

(72) Inventors: Dong Yang, Somerset, NJ (US); Daguang Xu, Princeton, NJ (US); Shaohua Kevin Zhou, Plainsboro, NJ (US); Bogdan Georgescu, Plainsboro, NJ (US); Mingqing Chen, Plainsboro, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 164 days.

(21) Appl. No.: 15/877,805

(22) Filed: Jan. 23, 2018

(65) Prior Publication Data
US 2018/0260957 A1    Sep. 13, 2018

Related U.S. Application Data

(60) Provisional application No. 62/468,400, filed on Mar. 8, 2017.

(51) Int. Cl.
G06T 7/11    (2017.01)
G06T 7/187    (2017.01)
(Continued)

(52) U.S. Cl.
CPC .............. *G06T 7/11* (2017.01); *G06T 7/0012* (2013.01); *G06T 7/143* (2017.01); *G06T 7/187* (2017.01);
(Continued)

(58) Field of Classification Search
None
See application file for complete search history.

(56) References Cited

U.S. PATENT DOCUMENTS 7,840,044 B2    11/2010    Ma et al.
8,073,330 B2    12/2011    Zheng
(Continued)

OTHER PUBLICATIONS

Linguraru et al., "Atlas-based Automated Segmentation of Spleen and Liver using Adaptive Enhancement Estimation"; MICCAI; 2009; 5762; pp. 1001-1008.
(Continued)

*Primary Examiner* — Tahmina N Ansari

(57) ABSTRACT

A method and apparatus for automated liver segmentation in a 3D medical image of a patient is disclosed. A 3D medical image, such as a 3D computed tomography (CT) volume, of a patient is received. The 3D medical image of the patient is input to a trained deep image-to-image network. The trained deep image-to-image network is trained in an adversarial network together with a discriminative network that distinguishes between predicted liver segmentation masks generated by the deep image-to-image network from input training volumes and ground truth liver segmentation masks. A liver segmentation mask defining a segmented liver region in the 3D medical image of the patient is generated using the trained deep image-to-image network.

19 Claims, 7 Drawing Sheets

(51) Int. Cl.
*G06T 7/143* (2017.01)
*G06T 7/00* (2017.01)

(52) U.S. Cl.
CPC .............. *G06T 2207/10081* (2013.01); *G06T 2207/10088* (2013.01); *G06T 2207/10104* (2013.01); *G06T 2207/20076* (2013.01); *G06T 2207/20081* (2013.01); *G06T 2207/20084* (2013.01); *G06T 2207/30056* (2013.01)

(56) References Cited

U.S. PATENT DOCUMENTS

| | | | |
|---|---|---|---|
| 8,131,038 B2 | 3/2012 | Saddi et al. | |
| 8,229,188 B2 | 7/2012 | Rusko et al. | |
| 9,367,924 B2 | 6/2016 | Gritsenko et al. | |
| 9,704,256 B2* | 7/2017 | Grbic | G06T 7/11 |
| 9,760,807 B2 | 9/2017 | Zhou et al. | |
| 9,785,858 B2* | 10/2017 | Seifert | G06K 9/4638 |
| 10,037,603 B2* | 7/2018 | Lay | G06T 5/005 |
| 2010/0080434 A1* | 4/2010 | Seifert | G06K 9/4638 |
| | | | 382/131 |
| 2015/0063668 A1 | 3/2015 | You et al. | |
| 2016/0267673 A1* | 9/2016 | Grbic | G06T 7/11 |
| 2017/0148156 A1 | 5/2017 | Bregman-Amitai et al. | |
| 2018/0075581 A1* | 3/2018 | Shi | G06T 3/4053 |
| 2018/0247201 A1* | 8/2018 | Liu | G06T 1/00 |
| 2018/0260957 A1* | 9/2018 | Yang | G06T 7/0012 |
| 2019/0080205 A1* | 3/2019 | Kaufhold | G06K 9/6257 |
| 2019/0149425 A1* | 5/2019 | Larish | H04L 41/145 |
| | | | 706/16 |

OTHER PUBLICATIONS

Kainmuller et al., "Shape Constrained Automatic Segmentation of the Liver based on a Heuristic Intensity Model"; MICCAI Workshop 3D Segmentation in the Clinic: A Grand Challenge; 2007; 10 pgs.

Lee et al., "Efficient Liver Segmentation Using a Level-Set Method with Optimal Detection of the Initial Liver Boundary from Level-Set Speed Images"; Computer Methods and Programs in Biomedicine; 2007; pp. 26-28.

Massoptier et al., "Fully Automatic Liver Segmentation Through Graph-Cut Technique"; Proceedings of the 29th Annual International Conference of the IEEE Engineering in Medicine and Biology Society; 2007.

Ling et al., "Hierarchical, Learning-Based Automatic Liver Segmentation"; Siemens Corporate Research, USA; Siemens Medical Solutions, Germany; 2008; 8 pgs.

Dou et al., "3D Deeply Supervised Network for Automatic Liver Segmentation from CT Volumes"; MICCAI; Jul. 3, 2016; 8 pgs.

Christ et al., "Automatic Liver and Lesion Segmentation in CT Using Cascaded Fully Convolutional Neural Networks and 3D Conditional Random Fields"; MICCAI; Oct. 7, 2016; 8 pgs.

Lu et al., "Automatic 3D Liver Location and Segmentation Via Convolutional Neural Networks and Graph Cut"; International Journal of Computer Assisted Radiology and Surgery; May 10, 2016; 12 pgs.

Goodfellow et al., "Generative Adversarial Nets"; Universite de Montreal; Montreal, QC; Jun. 10, 2014; 9 pgs.

Luc et al., "Semantic Segmentation Using Adversarial Networks"; Workshop on Adversarial Training; NIPS 2016; Barcelona, Spain; 12 pgs.

Ronneberger et al., "U-Net: Convolutional Networks for Biomedical Image Segmentation"; In International Conference on Medical Image Computing and Computer-Assisted Intervention; Springer International Publishing; May 18, 2015; pp. 234-241.

Merkow et al., "Dense Volume-to-Volume Vascular Boundary Detection"; Unversity of California, San Diego; Standford University; 2016; 8 pgs.

Heimann et al., Comparison and Evaluation of Methods for Liver Segmentation from CT Datasets; IEEE Transactions on Medical Imaging; vol. 28; No. 8; Aug. 2009; pp. 1251-1265.

\* cited by examiner

| Block | Layer | s | f | Block | Layer | s | f | Block | Layer | s | f | Block | Layer | s | f |
|---|---|---|---|---|---|---|---|---|---|---|---|---|---|---|---|
| 1 | Conv. | 1 | 16 | 6 | Up. | 2 | - | 10 | Conv. | 1 | 8 | 13 | Conv. | 1 | 1 |
| 1 | Conv. | 2 | 16 | 6 | Conv. | 1 | 128 | 10 | Conv. | 1 | 8 | 14 | Conv. | 1 | 16 |
| 2 | Conv. | 1 | 32 | 7 | Up. | 2 | - | 10 | Conv. | 1 | 8 | 14 | Conv. | 2 | 16 |
| 2 | Conv. | 2 | 32 | 7 | Conv. | 1 | 64 | 10 | Conv. | 1 | 1 |  | Conv. | 1 | 32 |
| 3 | Conv. | 1 | 64 | 8 | Up. | 2 | - | 11 | Up. | 4 | - | 15 | Conv. | 1 | 32 |
| 3 | Conv. | 2 | 64 | 8 | Conv. | 1 | 32 | 11 | Conv. | 1 | 8 | 15 | Conv. | 2 | 32 |
| 4 | Conv. | 1 | 128 | 9 | Up. | 2 | - | 11 | Conv. | 1 | 8 | 16 | Conv. | 1 | 64 |
| 4 | Conv. | 2 | 128 | 9 | Conv. | 1 | 16 | 11 | Conv. | 1 | 1 | 16 | Conv. | 1 | 64 |
| 5 | Conv. | 1 | 256 |  | Up. | 16 | - | 12 | Up. | 1 | - | 16 | Conv. | 1 | 64 |
| 5 | Conv. | 1 | 256 |  | Conv. | 1 | 8 | 12 | Conv. | 1 | 1 | 16 | Conv. | 1 | 1 |

---
Algorithm 1: Adversarial training of generator and discriminator.

Input : pre-trained generator (DI2IN) with weights $\theta_0^G$
Output: updated generator weights $\theta_f^G$ 1  for number of training iterations do
2     for $k_D$ steps do
3        sample a mini-batch of training images $x \sim p_{data}$;
4        generate prediction $y_{pred}$ for $x$ with $G(x; \theta_0^G)$;  ← 502
5        $\theta^D \leftarrow$ propagate back the stochastic gradient $\nabla l_D(y_{gt}, y_{pred})$;
6     end
7     for $k_G$ steps do
8        sample a mini-batch of training images $x' \sim p_{data}$;  ← 504
9        generate $y'_{pred}$ for $x'$ with $G(x'; \theta_0^G)$ and compute $D(G(x'))$;
10       $\theta_f^G \leftarrow$ propagate back the stochastic gradient $\nabla l_G(y_{gt}, y'_{pred})$;
11    end
12    $\theta_0^G \leftarrow \theta_f^G$
13 end
---

AUTOMATIC LIVER SEGMENTATION USING ADVERSARIAL IMAGE-TO-IMAGE NETWORK

This application claims the benefit of U.S. Provisional Application No. 62/468,400, filed Mar. 8, 2017, the disclosure of which is herein incorporated by reference.

BACKGROUND OF THE INVENTION

The present invention relates to automatic liver segmentation in medical images, and more particularly, to deep-learning based automatic liver segmentation in 3D medical images.

Accurate liver segmentation in three dimensional (3D) medical images, such as computed tomography (CT) or magnetic resonance (MR) images, is important in many clinical applications, such as pathological diagnosis of hepatic diseases, surgical planning, and postoperative assessment. However, automatic liver segmentation in medical images is a highly challenging task due to complex background, fuzzy boundaries, and varying appearance of the liver in medical images.

Various methods have been proposed for computer-based automatic liver segmentation from 3D CT scans. Such methods can be generally categorized into non-learning-based and learning-based approaches. Non-learning-based approaches usually rely on the statistical distribution of the intensity, and examples of non-learning-based approaches include atlas-based, active shape model (ASM)-based, level set-based, and graph cut-based segmentation methods. Learning-based approaches typically take advantage of handcrafted features to train machine-learning based classifiers to perform the liver segmentation. However, due to the challenges of liver segmentation, such as complex background, fuzzy boundaries, and varying appearance of the liver in medical images, the existing approaches cannot always provide accurate liver segmentation results. Accordingly, a method for accurate computer-based automatic liver segmentation in medical images is desirable.

BRIEF SUMMARY OF THE INVENTION

The present invention provides a method and system for automated computer-based liver segmentation in 3D medical images. Embodiments of the present invention utilize a trained deep image-to-image network to generate a liver segmentation mask from an input medical image of a patient. Embodiments of the present invention train the deep image-to-image network for liver segmentation in an adversarial network, in which the deep image-to-image network is trained together with a discriminator network that attempts to distinguish between ground truth liver segmentation masks and liver segmentation masks generated by the deep image-to-image network.

In one embodiment of the present invention, a 3D medical image of a patient is received. The 3D medical image of the patient is input to a trained deep image-to-image network. The trained deep image-to-image network is trained in an adversarial network together with a discriminative network that distinguishes between predicted liver segmentation masks generated by the deep image-to-image network from input training volumes and ground truth liver segmentation masks. A liver segmentation mask defining a segmented liver region in the 3D medical image of the patient is generated using the trained deep image-to-image network.

These and other advantages of the invention will be apparent to those of ordinary skill in the art by reference to the following detailed description and the accompanying drawings.

BRIEF DESCRIPTION OF THE DRAWINGS

FIG. 4 illustrates an exemplary architecture for a generator/DI2IN and a discriminator according to an embodiment of the present invention;

FIG. 5 illustrates an algorithm for adversarial training of the generator and the discriminator according to an embodiment of the present invention;

DETAILED DESCRIPTION

Figure 1:
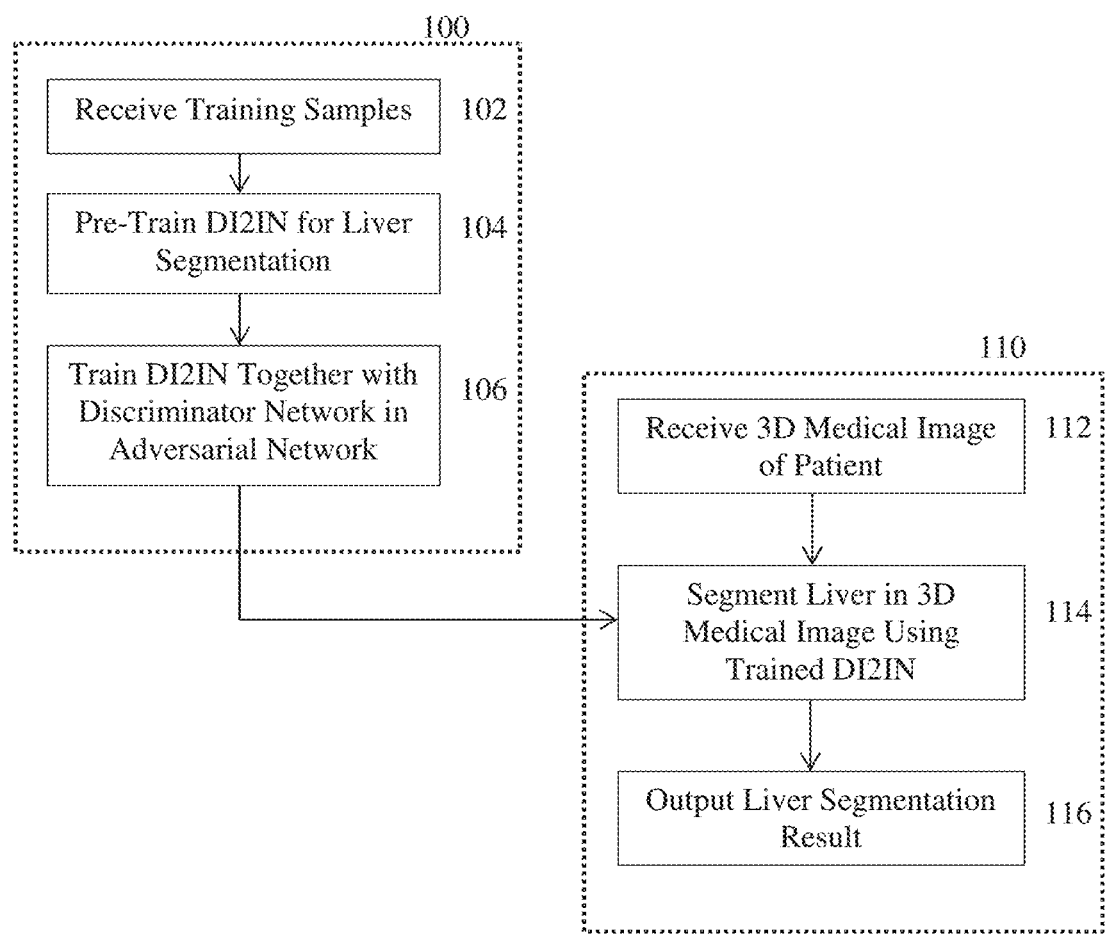
FIG. 1 illustrates a method for automated liver segmentation in 3D medical images according to an embodiment of the present invention.

The present invention relates to a method and system for automated computer-based liver segmentation in 3D medical images. Embodiments of the present invention are described herein to give a visual understanding of automated liver segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Various methods have been proposed for computer-based automatic liver segmentation from 3D CT scans. Such methods can be generally categorized into non-learning-based and learning-based approaches. Non-learning-based approaches usually rely on the statistical distribution of the intensity, and examples of non-learning-based approaches include atlas-based, active shape model (ASM)-based, level set-based, and graph cut-based segmentation methods. Learning-based approaches typically take advantage of handcrafted features to train machine-learning based classifiers to perform the liver segmentation. However, due to the challenges of liver segmentation, such as complex background, fuzzy boundaries, and varying appearance of the liver in medical images, the existing approaches cannot always provide accurate liver segmentation results. Embodiments of the present invention perform deep-learning based liver segmentation in 3D medical images, which improves the accuracy of liver segmentation as compared to existing computer-based liver segmentation approaches. In addition, the deep-learning based liver segmentation described herein directly inputs the medical image data and does not require pre-defined features to be specified, as in previous learning based liver segmentation approaches.

Recently, deep learning has been shown to achieve superior performance in various challenging image analysis tasks. Various automatic liver segmentation approaches based on a convolutional neural network (CNN) have been proposed. In one approach, a fully convolutional network (FCN) is trained and an output of the FCN is refined with a fully connected conditional random field (CRF). Similarly, another approach has been proposed in which cascaded FCNs are followed by CRF refinement. Another approach uses an FCN with graph-cut based refinement. Although these methods have demonstrated good segmentation performance, they all require the use of pre-defined refinement approaches. For example, both CRF and graph-cut approaches are limited to the use of pairwise models. In addition, both CRF and graph-cut approaches are time consuming, and such approaches may cause serious leakage at boundary regions with low contrast, which is common in liver segmentation tasks.

Embodiments of the present invention perform automatic liver segmentation using an adversarial deep image-to-image network (DI2IN-AN). A generative adversarial network (GAN) has recently emerged as a framework for synthetic image generation tasks. The GAN has two parts: a generator and a discriminator. The generator tries to produce a synthetic image that is close to real samples, while the discriminator attempts to distinguish between real samples and synthetic images generated by the generator. According to an embodiment of the present invention, a deep image-to-image network (DI2IN) that produces liver segmentation masks from input 3D medical images acts as the generator and is trained together with a discriminator that attempts to distinguish between ground truth liver segmentation mask training samples and liver segmentation masks generated by the DI2IN from input medical images. In an advantageous embodiment, the DI2IN employs a convolutional encoder-decoder architecture combined with multi-level feature concatenation and deep supervision. In training, the DI2IN-AN attempts to optimize a multi-class cross-entropy loss together with an adversarial term that aims to distinguish between the output of the DI2IN and the ground truth. Advantageously, the discriminator pushes the generator's output towards the distribution of ground truth, and thus enhances the generator's performance by refining its output during training. Since the discriminator can be implemented using a CNN which takes the joint configuration of many input variables, the discriminator embeds higher-order potentials in the adversarial network. The proposed method also achieves higher computing efficiency since the discriminator is used during training to enhance the performance of the DI2IN, but does not need to be executed during inference when the trained DI2IN is used to perform liver segmentation in newly input medical images. In addition, since the performance of the trained DI2IN is enhanced during training of the adversarial network, no further refinement approaches (e.g., CRF or graph-gut) are needed for the liver segmentation masks generated by the trained DI2IN, thus improving computational efficiency and run-time as compared to other proposed deep learning based approaches.

FIG. 1 illustrates a method for automated liver segmentation in 3D medical images according to an embodiment of the present invention. The method of FIG. 1 includes a training stage 100 and an inference stage 110. The training stage 100 is performed off-line to train a DI2IN for liver segmentation in 3D medical images. The inference stage 110 performs liver segmentation a newly received 3D medical image using the trained DI2IN resulting from the training stage 100. Once the trained DI2IN for liver segmentation is trained in the training stage 100, the inference stage 110 can be repeated for each newly received medical image(s) to segment a patient's liver in each newly received input medical image(s) using the trained DI2IN. The training stage 100 includes steps 102-106, and the inference stage 110 includes steps 112-116.

In the training stage 100, at step 102, training samples are received. The training samples include a plurality of training pairs and each training pair includes a training image and a corresponding ground truth liver segmentation mask for the training image. Each training image is a 3D medical image. In an advantageous embodiment, the training images are 3D computed tomography (CT) volumes. In a possible implementation, the training images may be contrast-enhanced CT volumes. In other possible embodiments, the training images may be 3D magnetic resonance (MR) images or 3D medical images acquired using other medical imaging modalities, such as ultrasound, positron emission tomography (PET), etc. The ground truth liver segmentation mask for each training image can be implemented as a 3D binary mask image of the same grid size as the training image in which liver voxels have an intensity value of one and voxels outside the liver boundary have an intensity value of zero. The ground truth liver segmentation masks can be generated based on manual annotations of liver boundaries in the training images. The training samples can be received by loading a number of previously acquired 3D medical images (training images) with annotated ground truth liver segmentations from a database of medical images. Alternatively, training images without annotations can be received from an image acquisition device, such as a CT scanner, or loaded from a database, and the training images can then be annotated in order to create the corresponding ground truth liver segmentation masks.

Figure 2:
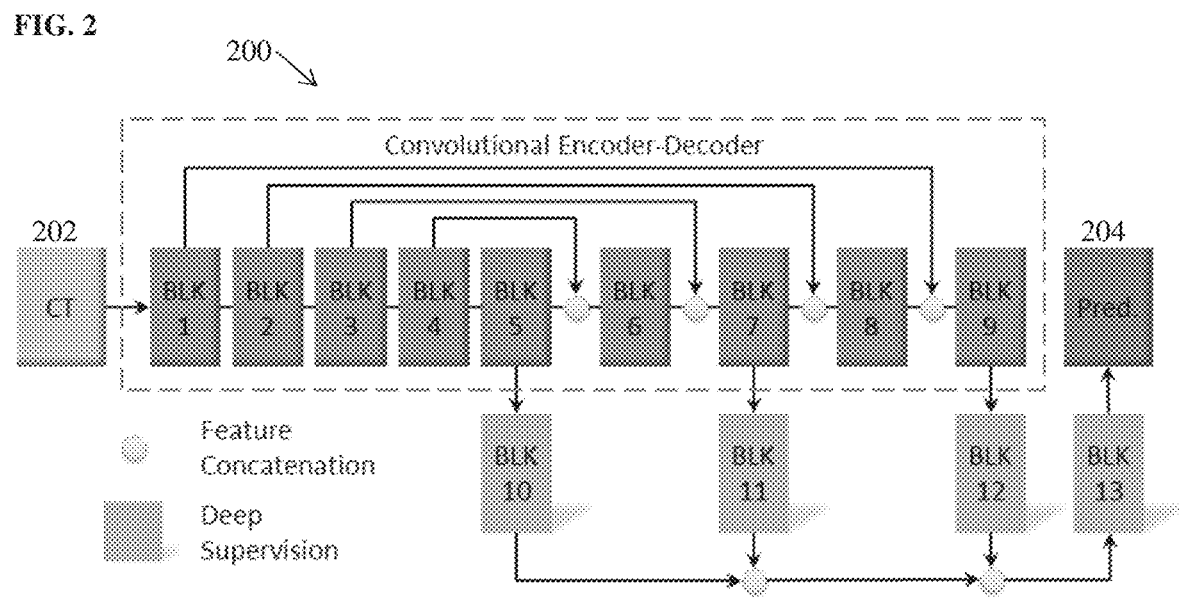
FIG. 2 illustrates a deep image-to-image network (DI2IN) for liver segmentation according to an embodiment of the present invention.

At step 104, a deep image-to-image network (DI2IN) for liver segmentation is pre-trained based on the training samples in a first training phase. The DI2IN is a multi-layer convolutional neural network (CNN) trained to perform liver segmentation in an input 3D medical image. FIG. 2 illustrates a deep image-to-image network (DI2IN) 200 for liver segmentation according to an embodiment of the present invention. The segmentation task performed by the DI2IN 200 is defined as the voxel-wise binary classification of an input 3D medical image. As shown in FIG. 2, the DI2IN 200 takes an entire 3D CT volume 202 as input, and outputs a probability map that indicates the probability/likelihood of voxels belonging to the liver region. It is straightforward to covert such a probability map to a binary liver segmentation mask by labeling all voxels with a probability score greater than a threshold (e.g., 0.5) as positive (in the liver region) and all voxels with a probability score less than the threshold as negative (not in the liver region). The prediction 204 output by the DI2IN 200 for a given input 3D CT volume 202 can be output as a probability map or a binary liver segmentation mask.

As shown in FIG. 2, the main structure of the DI2IN 200 is designed symmetrically as a convolutional encoder-decoder. Each of the blocks (BLK 1-BLK 13) of the DI2IN 200 represents one or more layers of the network. The blocks of the DI2IN 200 include 3D convolutional and/or bilinear upscaling layers. Details of the network architecture of the DI2IN 200 for an advantageous implementation are shown in FIG. 4. In FIG. 4, parametric settings for blocks 1-13 of the DI2IN 2000 are shown, where s denotes the stride, f is the filter number, "Cony." denotes a convolutional layer, and "Up." denotes a bilinear upscaling layer. In the encoder part (BLK 1-BLK 4) of the DI2IN 200 only convolutional layers are used in all of the blocks. In order to increase the receptive field of neurons and lower the GPU memory consumption, the stride is set as 2 at some layers in the encoder and the size of the feature maps is reduced at each of those layers. Moreover, a larger receptive field covers more contextual information and helps to preserve liver shape information in the prediction. The decoder (BLK 5-BLK 9) of the DI2IN 200, the blocks include convolutional layers and bilinear upscaling layers. To enable end-to-end prediction and training, the upscaling layers are implemented as bilinear interpolation to enlarge the activation maps. In an exemplary implementation, all convolutional kernels are 3×3×3. The upscaling factor in the upscaling layers of the decoder is 2 for x, y, z dimension. In an exemplary implementation, the Leaky rectifier linear unit (Leaky ReLU) and batch normalization are adopted in all convolutional layers for proper gradient back propagation.

In order to improve the performance of the DI2IN 200, the DI2IN 200 utilizes feature concatenation in which fast bridges are built directly from the encoder layers to the decoder layers. The bridges pass information from the encoder forward and then concatenate the information with the decoder feature layers. The combined feature is then used as input for the next convolutional layer of the decoder. By following these steps to explicitly combine and advance low-level features, the DI2IN 200 benefits from local and global contextual information.

Deep supervision of the neural network is shown to achieve good boundary detection and segmentation results. According to an advantageous embodiment of the present invention, in the DI2IN 200 of FIG. 2, a more complex deep supervision scheme is introduced to improve performance. In particular, blocks 10-13 of the DI2IN 200 deep supervision at multiple levels of the decoder section of the DI2IN 200. Several branches (blocks 10, 11, and 12) are separated from layers of the decoder section of the main DI2IN 200. With appropriate upscaling and convolution operations in these blocks, the output size channel for all of these branches matches the size of the input image. For example, as shown in FIG. 4, upscaling factors of 16, 4, and 1 are used in blocks 10, 11, and 12, respectively. By calculating the loss item $l_i$ with the same ground truth data, the supervision is enforced at the end of each branch i. In order to further utilize the results of the different branches, the final output can be determined by the convolution operations of all the branches with the leaky ReLU. During training, binary cross entropy loss is applied to each voxel of the output layers. The total loss $l_{total}$ to be minimized in training is the weighted combination of loss terms for all output layers, including the final output layer (i.e., the output layer of block 13) and the output layers for all the branches (i.e., the output layers of blocks 10, 11, and 12), as follows:

$$l_{total} = \sum_i w_i \cdot l_i + w_{final} \cdot l_{final}$$

where $w_i$ and $w_{final}$ are weighting coefficients. During training, gradient descent backpropagation can be used to learn weights for the layers of the DI2IN 200 to minimize the total loss $l_{total}$ over a set of training samples.

Figure 3:
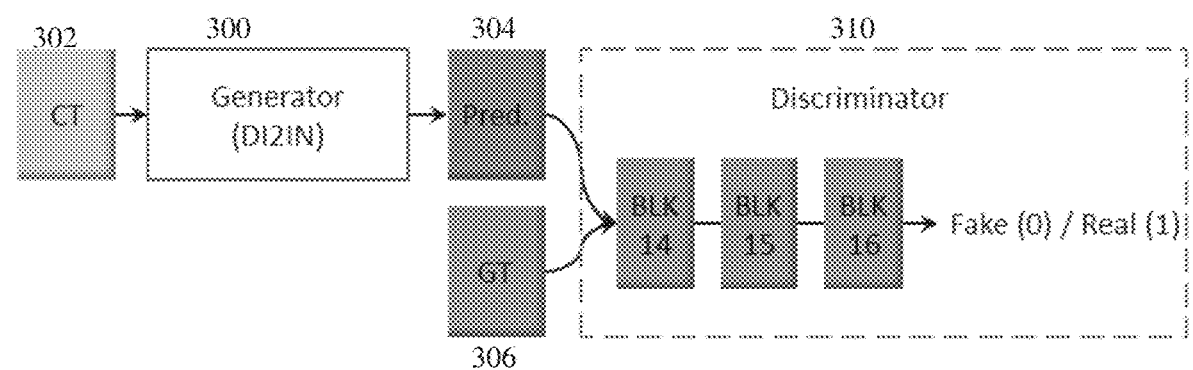
FIG. 3 illustrates an adversarial network according to an embodiment of the present invention.

Returning to FIG. 1, at step 106, the DI2IN is trained together with a discriminator network in an adversarial network in a second training phase. As described above, the DI2IN for liver segmentation can be pre-trained in the first training phase to minimize a loss calculated between ground truth outputs and predicted outputs over a set of training samples. According to an advantageous embodiment, the DI2IN is trained together with a discriminator network in adversarial network in order to boost the performance of the DI2IN. FIG. 3 illustrates an adversarial network according to an embodiment of the present invention. As shown in FIG. 3, the adversarial network includes a generator 300 and a discriminator 310. According to an advantageous embodiment, the generator 300 is the DI2IN for liver segmentation. For example, the generator 300 can be the DI2IN 200 having the network structure shown in FIG. 2. The discriminator 310 is a deep neural network that attempts to distinguish between ground truth liver segmentation masks and predicted liver segmentation masks generated by the generator 300 (DI2IN) from training images. The adversarial network is utilized in training to capture high-order appearance information, which distinguishes between the ground truth and output from the DI2IN. During training, the generator 300 inputs training CT volumes 302 and generates predictions 304 (i.e., predicted liver segmentation masks or probability maps) from the input training CT volumes 302. The discriminator 310 inputs ground truth liver segmentation masks 306 and the predictions 304 generated by the generator 300, and classifies these images as real/ground truth (positive) or fake/prediction (negative).

The generator 300 can be implemented using the structure of the DI2IN 200 shown in FIG. 2. As shown in FIG. 3, in an advantageous embodiment, the discriminator 310 includes blocks 14-16, each of which include one or more convolutional layers. FIG. 4 illustrates an exemplary architecture for the generator 300/DI2IN 200 and the discriminator 400 according to an embodiment of the present invention. As shown in FIG. 4, table 400 provides exemplary parametric settings for blocks 1-13 of the DI2IN 200 (generator 300) and blocks 14-16 of the discriminator 310. In table 400 of FIG. 4, s denotes the stride, f is the filter number, "Cony." denotes a convolutional layer, and "Up." denotes a bilinear upscaling layer. These parametric settings are preset and describe the network architecture of the DI2IN 200/generator 300 and the discriminator 310, and are not to be confused with the network parameters/weights that are learned/adjusted during training.

In order to guide the generator 300 (DI2IN) to better prediction, the adversarial network provides an extra loss function for updating parameters (weights) of the generator 300 during training. The purpose of the extra loss function is to make the prediction as close as possible to the ground truth labeling. Binary cross-entropy loss is used for training the adversarial network. D and G are used herein to represent the discriminator 310 and generator 300 (DI2IN), respectively. For the discriminator $D(Y;\theta^D)$, the ground truth label $Y_{gt}$ is assigned as one and the prediction label $Y_{pred} = G(X;\theta^G)$ is assigned to zero, where X is the set of input training CT volumes. $\theta^D$ and $\theta^G$ represent the parameters (weights) of the discriminator and generator, respectively, that are learned/adjusted during training. In order to train the adversarial network, the following loss function $l_D$ is used for the discriminator D:

$$l_D = -E\Sigma_{y \sim p_{gt}} \log(D(y; \theta^D)) - E\Sigma_{y' \sim p_{pred}} \log(1 - D(y'; \theta^D)) \quad (1)$$
$$= -E\Sigma_{y \sim p_{gt}} \log(D(y; \theta^D)) - E\Sigma_{x \sim p_{pred}} \log(1 - D(G(x; \theta^G); \theta^D)),$$

where x denote an input training volume, y denotes a ground truth liver segmentation map, and $y'=G(x;\theta^G)$ denotes a prediction generated by the generator G for a given input training volume x. The first component of the loss function $l_D$ relates to positive classification by the discriminator D of the ground truth samples, and the second component of the loss function $l_D$ relates to negative classification by the discriminator D of the predictions generated by the generator G from the input training volumes. The parameters $\theta^D$ of the discriminator D are learned by adjusting the parameters $\theta^D$ to minimize the loss function $l_D$. As both of the terms in Equation (1) are negative, minimizing the loss function $l_D$ maximizes the probability of positive classification of the ground truth samples by the discriminator D and maximizes the probability of negative classification by the discriminator D of the predictions generated by the generator G, over a set of training samples. During training of the discriminator network D, the gradient of the loss $l_D$ is propagated back to update the parameters $\theta^D$ of the discriminator network D.

After the parameters $\theta^D$ of the discriminator D are adjusted, the generator G (DI2IN) is trained by adjusting the parameters $\theta^G$ to minimize the following loss function $l_G$:

$$l_G = E\Sigma_{y' \sim p_{pred}, y \sim p}[l_{seg}(y', y)] + \lambda E\Sigma_{y \sim p_{pred}} \log(1 - D(y'; \theta^D)) \quad (2)$$
$$= E\Sigma_{y' \sim p_{pred}, y \sim p}[l_{seg}(y', y)] + \lambda E\Sigma_{x \sim p_{data}} \log(1 - D(G(x; \theta^G); \theta^D)).$$

As shown in Equation (2), the loss $l_G$ for the generator G has two components. The first component of the loss function $l_G$ is the segmentation loss $l_{seg}$, which is calculated as the voxel-wise binary cross entropy between the prediction and ground truth labels (i.e., predicted liver segmentation mask and ground truth segmentation mask) associated with a particular input training image. In an advantageous implementation, the segmentation loss $l_{seg}$ can be calculated using the total loss $l_{total}$ described above. The second component of the loss function $l_G$ relates to probability scores calculated by the discriminator D for the predictions generated by the generator G. In particular, minimizing the second loss component in Equation (2) minimizes the probability of negative classification (i.e., classification as a prediction) by the discriminator D of the predictions generated by the generator G. Accordingly, minimizing the second loss component in Equation (2) enables the generator G to generate predictions that will confuse the discriminator D. In an advantageous implementation, $-\log(1-D(G(x)))$ in Equation (2) is replaced with $\log(D(G(x)))$. In other words, instead of minimizing the probability of the predictions being negatively classified (i.e., classified as predictions) by the discriminator D, the training can maximize the probability of the predictions being positively classified (i.e., classified as ground truth) by the discriminator D. Such replacement provides a strong gradient during training of G and speeds up the training process in practice. In this case, the loss function $l_G$ can be expressed as:

$$l_G = E\Sigma_{y \sim p_{pred}, y \sim p}[l_{seg}(y, y)] - \lambda E\Sigma_{x \sim p_{data}} \log(D(G(x; \theta^G); \theta^D))). \quad (3)$$

FIG. 5 illustrates an algorithm 500 for adversarial training of the generator and the discriminator according to an embodiment of the present invention. As shown in FIG. 5, the algorithm 500 inputs a pre-trained generator (DI2IN) with weights $\theta_0^G$ and outputs learned updated generator weights $\theta_1^G$. For example, the generator (DI2IN) can be pre-trained as described above in step 104 of FIG. 1. The algorithm 500 iterates discriminator D training 502 and generator G training 504 for a plurality of training iterations. In the discriminator D training 502, a mini-batch of training images $x \sim p_{data}$ are sampled, a prediction $y_{pred}$ is generated for each training image x by the generator with the current generator weights G $(x;\theta_0^G)$, and discriminator weights $\theta^D$ are learned to minimize the discriminator loss function $l_D$ by propagating back the stochastic gradient $\nabla l_D$ $(y_{gt}, y_{pred})$ to update the discriminator weights $\theta^D$. These operations are repeated $k_D$ times, and then the algorithm proceeds to the generator G training 504. In the generator G training, a mini-batch of training images $x \sim p_{data}$ are samples, a prediction $y_{pred}$ is generated for each training image x by the generator with the current generator weights G $(x;\theta_0^G)$ and a classification score $D(G(x'))$ is computed by the discriminator for each prediction, and updated generator weights $\theta_1^G$ are learned to minimize the generator loss function $l_G$ by propagating back the stochastic gradient $\nabla l_G$ $(y_{gt}', y_{pred}')$. These operations are repeated $k_G$ times. The alternating of the discriminator training 502 and generator training 504 is iterated for a plurality of iterations, until the discriminator is not able to easily distinguish between the ground truth label maps (ground truth liver segmentation masks) and the predictions output by the DI2IN (predicted liver segmentation masks). For example, the discriminator training 502 and the generator training 504 can be iterated until the discriminator weights and the generator weights converge or until a predetermine number of maximum iterations is reached. The algorithm 500 outputs the final updated generator weights. After the training process, the adversarial network is no longer needed during the inference stage (110 of FIG. 1). The trained generator (DI2IN) itself can be used during the inference stage (110) to provide high quality liver segmentation, with improved performance due to the adversarial training.

As described above, in the training stage 100 of FIG. 1, the DI2IN is pre-trained by itself in a first training phase and then trained together with the discriminator using adversarial training in a second training phase. For the adversarial training, the weights of the discriminator can be initialized using randomly selected weights or other preset initial weights. In an alternative embodiment, the adversarial training can be performed without first pre-training the DI2IN. In this case the weights of the DI2IN/generator and the weights of the discriminator can be initialized using randomly selected weights or other preset initial weights and the adversarial training can be performed starting with the initialized weights for both the DI2IN/generator and the discriminator.

Returning to FIG. 1, in the inference stage 110, at step 112, a 3D medical image of a patient is received. In an advantageous embodiment, the 3D medical image is a 3D CT volume, however present invention is not limited thereto and other medical imaging modalities (e.g., MR, ultrasound, PET, etc.) may be used as well. The 3D medical image may be received directly from an image acquisition device, such as a CT scanner, or the 3D medical image may be received by loading a previously acquired 3D medical image of the patient from a memory or storage a computer system or receiving the 3D medical image as an electronic transmission from a remote computer system.

At step 114, the liver is segmented in the 3D medical image using the trained DI2IN. As described above, the DI2IN for liver segmentation is trained as the generator network of an adversarial network including the generator (DI2IN) and a discriminator network. In order to segment the liver in the received 3D medical image, the received 3D medical image is input to the trained DI2IN and the trained DI2IN generates a liver segmentation mask from the input 3D medical image. The liver segmentation mask defines a segmented liver region in the 3D medical image.

At step 116, the liver segmentation result is output. For example, the liver segmentation mask generated by the trained DI2IN can be displayed on a display device of a computer system. The liver segmentation mask can be overlaid on the original received input image to highlight the segmented liver region or a boundary of the segmented liver region in the 3D medical image. The liver segmentation mask and/or 3D medical image showing the segmented liver region can be displayed as a 3D visualization or by displaying 2D slices of the liver segmentation mask and/or segmented 3D medical image. The liver segmentation mask can be used to generate a 3D mesh representing the segmented liver region in the 3D medical image and/or contours representing the segmented liver boundary in slices of the 3D medical image.

Figure 6:
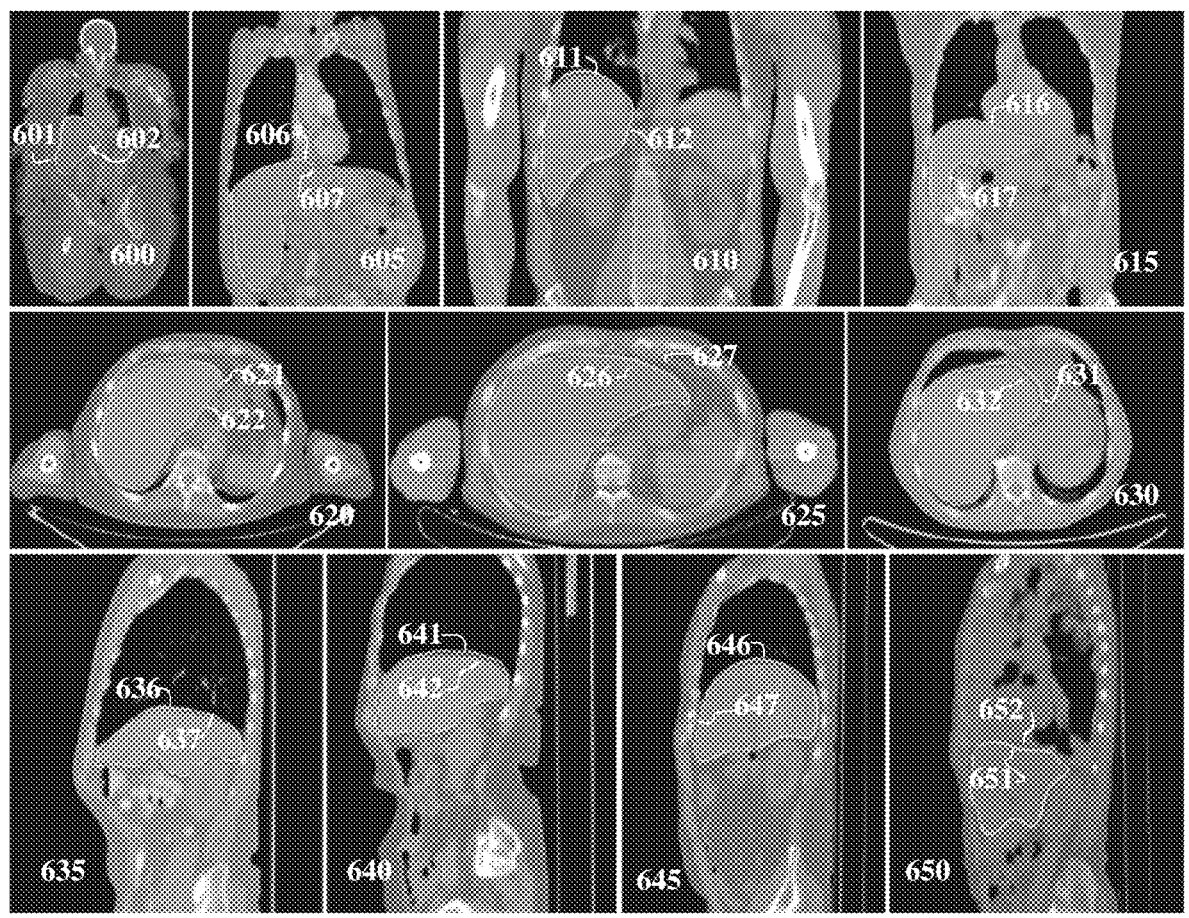
FIG. 6 illustrates exemplary liver segmentation results in 3D CT volumes generated using the method of FIG. 1.

FIG. 6 illustrates exemplary liver segmentation results in 3D CT volumes generated using the method of FIG. 1. As shown in FIG. 6, images 600, 605, 610, 615, 620, 625, 630, 635, 640, 645, and 650 show respective ground truth liver boundaries 601, 606, 611, 616, 626, 631, 636, 641, 646, and 651 and respective predicted liver boundaries 602, 607, 612, 617, 622, 627, 632, 637, 642, 647, and 652 generated using the DI2IN trained in the adversarial network in different CT slices. As can be observed in FIG. 6, in most views, the predicted liver boundaries are virtually indistinguishable from the ground truth liver boundaries.

Most public datasets for liver segmentation only include tens of cases. For example, the MICCAI-Sliver07 dataset only contains 20 CT volumes for training and 10 CT volumes for testing. All of the data are contrast enhanced. Such a small dataset is no suitable to show the power of CNN, as neural networks trained with more labelled data can usually achieve better performance. The present inventors collected more than 1000 CT volumes for training. The liver of each CT volume was delineated by human experts. These CT volumes cover large variations in population contrast phases, scanning ranges, pathologies, and field of view (FOV). The inter-slice distance varies from 0.5 mm to 0.7 mm. All of the scans cover the abdominal regions, but some may extend to the head and/or feet as well. Tumors can be found in multiple cases. Other diseases are present in the CT volumes as well. For example, pleural effusion, which brightens the lung region and changes the pattern of the upper boundary of the liver, is present in some of the scans. An additional 50 CT volumes were collected from clinical sites for independent testing. The livers in these scans were also annotated by human experts for the purpose of evaluation. The dataset was down-sampled into 3.0 mm resolution isotropically to speed up the processing and lower the consumption of computer memory without loss of accuracy. In the adversarial training, $\lambda$ was set to 0.01, and the number of overall training iterations used was 100. For training the discriminator D, $k_D$ was 10 and the mini-batch size was 8. For training the DI2IN generator G, $k_G$ was 1 and the mini-batch size was 4. For calculating the segmentation loss, $w_i$ was set as 1.

Table 1 shows a comparison of the performance of five different methods for liver segmentation. The first method, the hierarchical, learning-based algorithm described in Ling et al., "Hierarchical, Learning-Based Automatic Liver Segmentation", CVPR, 1-8, 2008, was trained using 400 CT volumes. More training data did not show performance improvement for this method. For comparison purposes a DI2IN without adversarial training and a DI2IN with adversarial training (DI2IN-AN) were also trained using the same 400 CT volumes. Both the DI2IN and the DI2IN-AN were also each trained using all 1000+CT volumes. The average symmetric surface distance (ASD) and dice coefficients were computed for all methods on the test data. As shown in Table 1, DI2IN-AN achieves the best performance in both evaluation metrics. All of the deep learning algorithms out-perform the classic learning based algorithm with the hand-crafted features (Ling et al.), which shows the power of CNN. The results show that more training data enhances the performance of both DI2IN and DI2IN-AN. Take DI2IN for example, training with 1000+ labelled data improves the mean ASD by 0.23 mm and the max ASD by 3.84 mm. Table 1 also shows that the adversarial training structure further boosts the performance of DI2IN. The maximum ASD error is also reduced using the DI2IN-AN. FIG. 6 shows exemplary liver segmentation results generated using DI2IN-AN. The present inventors also tried conditional random field (CRF) and graph cut to refine the output of the DI2IN. However, the results became worse, since a large portion of the testing data had no contrast and the boundary of the liver bottom at many locations was very fuzzy. CRF and graph cut both suffer from serious leakage in these situations. Using a NVIDIA TITAN X GPU and the Theano/Lasagne library, the run time of liver segmentation using the DI2IN-AN method is less than one second, which is significantly faster than most current approaches. For example, another existing deep learning based liver segmentation approach requires 1.5 minutes to perform liver segmentation in a single CT volume.

TABLE 1

| Method | ASD (mm) | | | | Dice | | | |
|---|---|---|---|---|---|---|---|---|
| | Mean | Std | Max | Medium | Mean | Std | Min | Median |
| Ling et al. (400) [5] | 2.95 | 5.07 | 37.45 | 2.01 | 0.92 | 0.11 | 0.20 | 0.95 |
| DI2IN (400) | 2.38 | 1.31 | 10.35 | 2.0 | 0.94 | 0.03 | 0.79 | 0.94 |
| DI2IN-AN (400) | 2.09 | 0.94 | 7.94 | 1.88 | 0.94 | 0.02 | 0.85 | 0.95 |
| DI2IN (1000) | 2.15 | 0.81 | 6.51 | 1.95 | 0.94 | 0.02 | 0.87 | 0.95 |
| DI2IN-AN (1000) | 1.95 | 0.75 | 6.48 | 1.81 | 0.95 | 0.02 | 0.88 | 0.95 |

Figure 7:
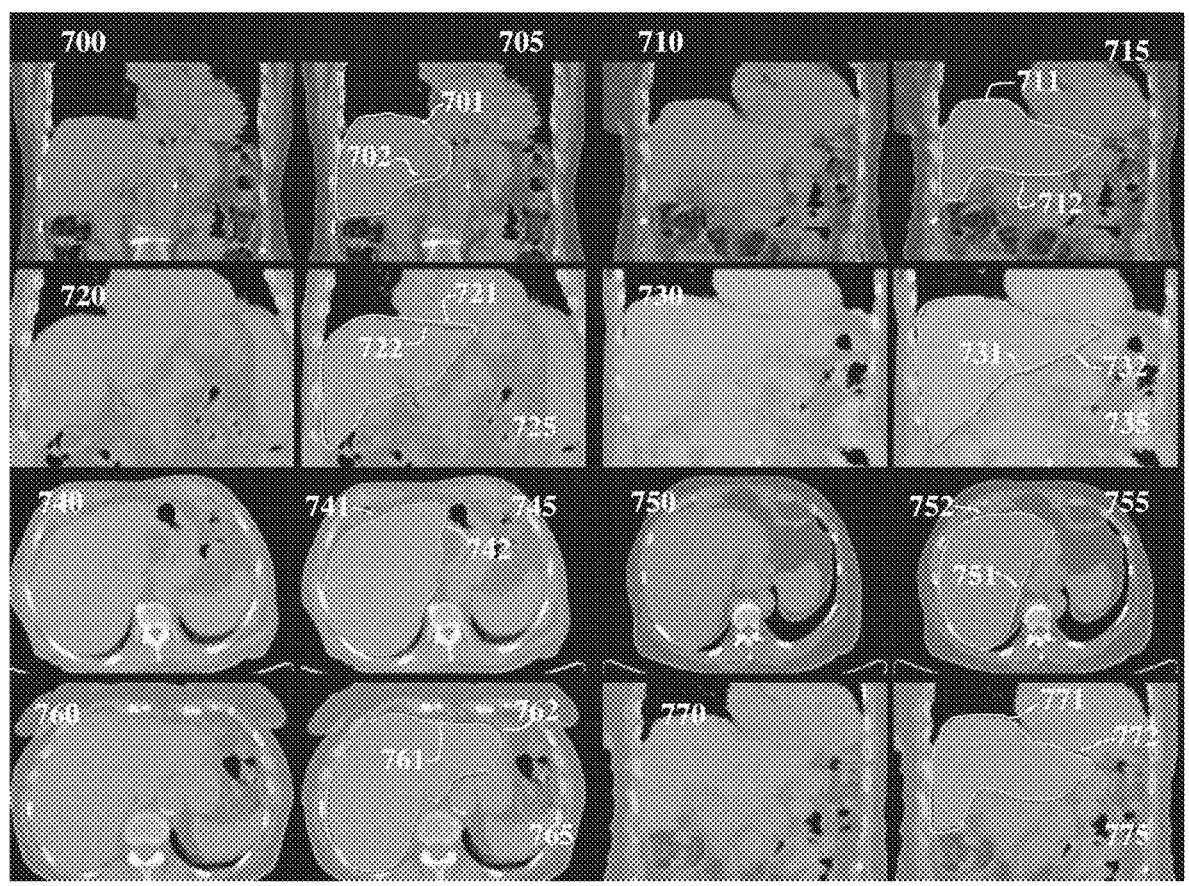
FIG. 7 illustrates exemplary liver segmentation results using the method of FIG. 1 in CT volumes without contrast.

FIG. 7 illustrates exemplary liver segmentation results using the method of FIG. 1 in CT volumes without contrast. As shown in FIG. 7, images 700, 710, 720, 730, 740, 750, 760, and 770 are CT image slices. Image 705 shows the ground truth liver boundary 701 and the segmented liver boundary 702 using DI2IN-AN in image 700. Image 715 shows the ground truth liver boundary 711 and the segmented liver boundary 712 using DI2IN-AN in image 710. Image 725 shows the ground truth liver boundary 721 and the segmented liver boundary 722 using DI2IN-AN in image 720. Image 735 shows the ground truth liver boundary 731 and the segmented liver boundary 732 using DI2IN-AN in image 730. Image 745 shows the ground truth liver boundary 741 and the segmented liver boundary 742 using DI2IN-AN in image 740. Image 755 shows the ground truth liver boundary 751 and the segmented liver boundary 752 using DI2IN-AN in image 750. Image 765 shows the ground truth liver boundary 761 and the segmented liver boundary 762 using DI2IN-AN in image 760. Image 775 shows the ground truth liver boundary 771 and the segmented liver boundary 772 using DI2IN-AN in image 770. As can be observed in FIG. 7, even though the input CT images do not have contrast and the liver boundaries are very fuzzy, the DI2IN-AN liver segmentation still performs very well on the non-contrasted CT data.

Figure 8:
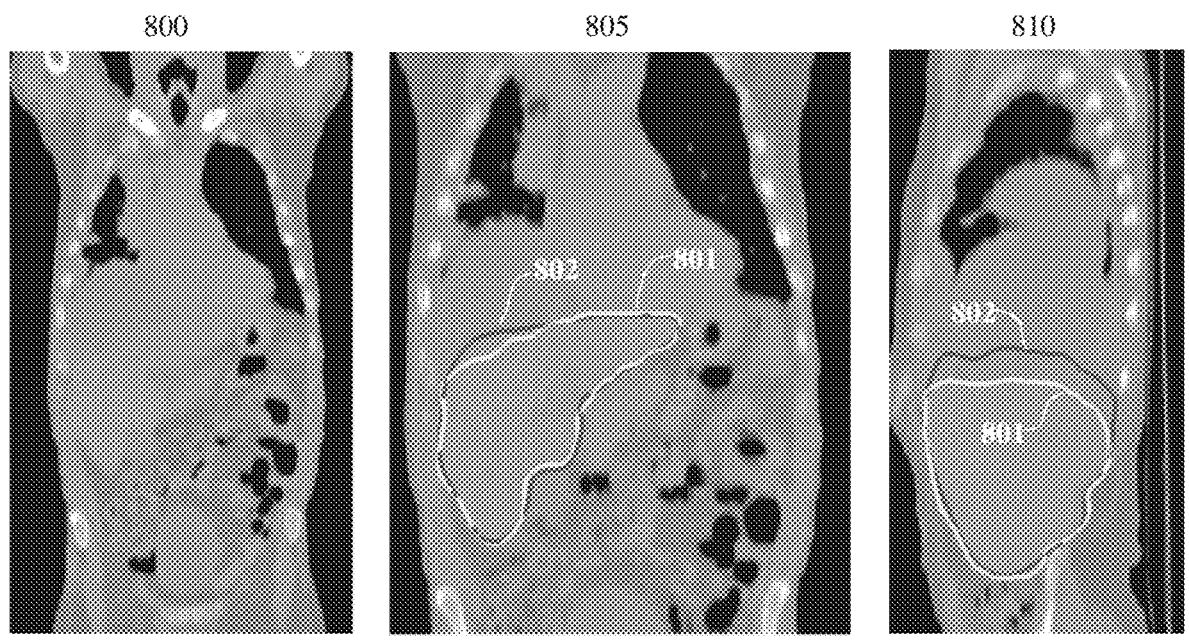
FIG. 8 illustrates exemplary liver segmentation results using the method of FIG. 1 in a CT volume of a patient with pleural effusion.

FIG. 8 illustrates exemplary liver segmentation results using the method of FIG. 1 in a CT volume of a patient with pleural effusion. As shown in FIG. 8, image 800 is a CT image of a patient with pleural effusion, which brightens the lung region and changes the pattern of the upper boundary of the liver. This significantly increases the difficult for automatic liver segmentation, since in most CT volumes the lung looks dark with a low intensity. A test case shown in FIG. 8 usually corresponds with the largest error for a given method in Table 1. Images 805 and 810 show the ground truth liver boundary 801 and segmented liver boundary 802 generated using DI2IN-AN in different slices of the CT volume of the patient with pleural effusion. Although the DI2IN-AN segmentation has difficulty at the upper boundary, it still outperforms the other methods in this challenging test case.

Figure 9:
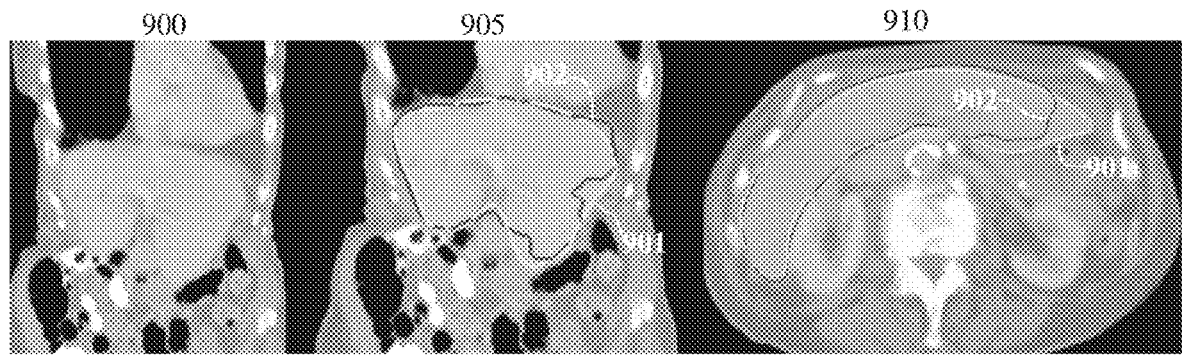
FIG. 9 illustrates exemplary liver segmentation results using the method of FIG. 1 in a CT volume of a patient with an enlarged liver.

FIG. 9 illustrates exemplary liver segmentation results using the method of FIG. 1 in a CT volume of a patient with an enlarged liver. Another challenging case for automatic liver segmentation is a patient with an enlarged liver. As shown in FIG. 9, image 900 is a CT image of a patient with an enlarged liver. Images 905 and 910 show the ground truth liver boundary 901 and the segmented liver boundary 902 generated using DI2IN-AN segmentation.

Figure 10:
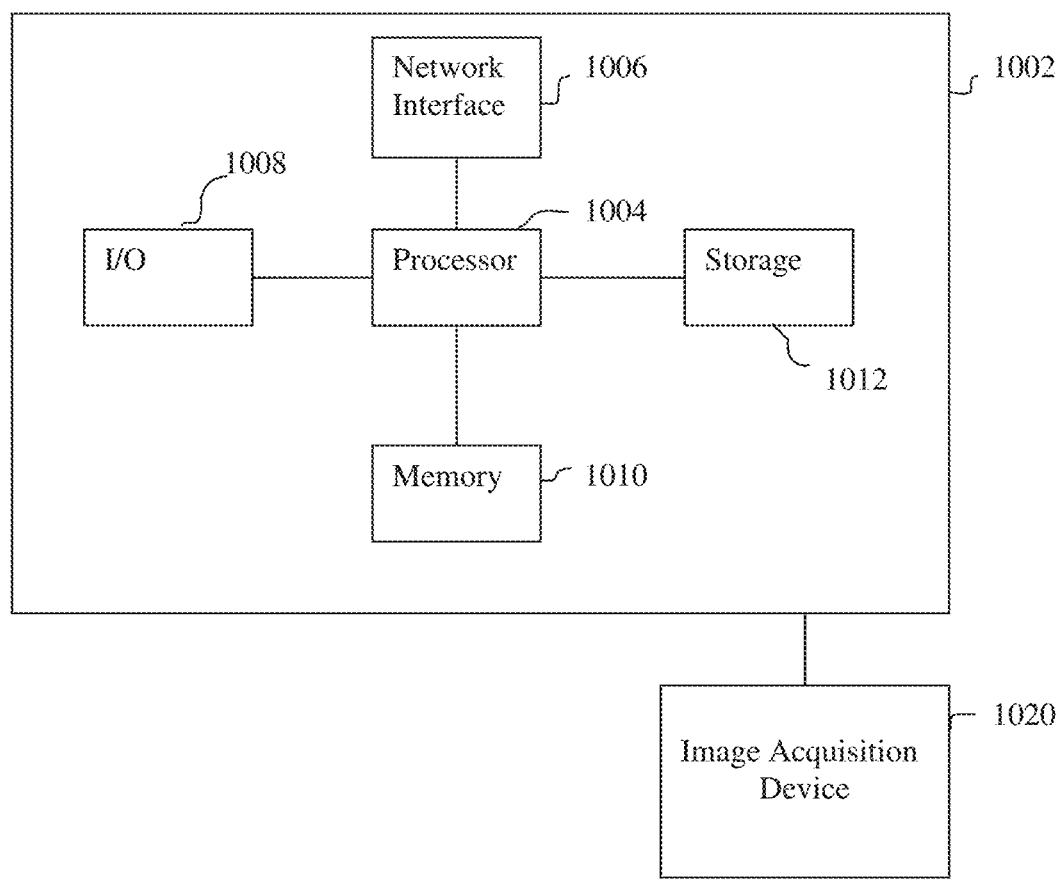
FIG. 10 is a high-level block diagram of a computer capable of implementing the present invention.

The above-described methods for automated liver segmentation in 3D medical images may be implemented on a computer using well-known computer processors, memory units, storage devices, computer software, and other components. A high-level block diagram of such a computer is illustrated in FIG. 10. Computer 1002 contains a processor 1004, which controls the overall operation of the computer 1002 by executing computer program instructions which define such operation. The computer program instructions may be stored in a storage device 1012 (e.g., magnetic disk) and loaded into memory 1010 when execution of the computer program instructions is desired. Thus, the steps of the methods of FIGS. 1 and 5 may be defined by the computer program instructions stored in the memory 1010 and/or storage 1012 and controlled by the processor 1004 executing the computer program instructions. An image acquisition device 1020, such as CT scanner, can be connected to the computer 1002 to input image data to the computer 1002. It is possible to implement the image acquisition device 1020 and the computer 1002 as one device. It is also possible that the image acquisition device 1020 and the computer 1002 communicate wirelessly through a network. In a possible embodiment, the computer 1002 can be located remotely with respect to the image acquisition device 1020 and the method steps described herein can be performed as part of a server or cloud based service. In this case, the method steps may be performed on a single computer or distributed between multiple networked computers. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.). Such input/output devices 1008 may be used in conjunction with a set of computer programs as an annotation tool to annotate images/volumes received from the image acquisition device 1020. One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for automated liver segmentation in a 3D medical image of a patient, comprising:
receiving a 3D medical image of a patient;
inputting the 3D medical image of the patient to a trained deep image-to-image network, wherein the trained deep image-to-image network is trained in an adversarial network together with a discriminative network based on a segmentation loss calculated as a voxel-wise cross entropy between predicted liver segmentation masks generated by the deep image-to-image network from input training volumes and ground truth liver segmentation masks, wherein the discriminative network distinguishes between the predicted liver segmentation masks and the ground truth liver segmentation masks; and
generating, using the trained deep image-to-image network, a liver segmentation mask defining a segmented liver region in the 3D medical image of the patient.

2. The method of claim 1, wherein the adversarial network including the deep image-to-image network and the discriminator network is trained by iteratively alternating discriminator network training based on a first loss function and deep image-to-image network training based on a second loss function for a plurality of iterations.

3. The method of claim 2, wherein the discriminator network training updates weights of the discriminator network to minimize the first loss function having a first component based on classification by the discriminator network of the ground truth liver segmentation masks and a second component based on classification by the discriminator network of the predicted liver segmentation masks generated by the deep image-to-image network from the input training volumes, and wherein minimizing the first loss function increases a probability of the discriminator network correctly classifying the ground truth liver segmentation masks as positive and increases a probability of the discriminator network correctly classifying the predicted liver segmentation masks as negative.

4. The method of claim 3, wherein the deep image-to-image network training updates weights of the deep image-to-image network to minimize the second loss function having a first component that calculates the segmentation loss between the predicted liver segmentation masks generated by the deep image-to-image network from the input training volumes and the ground truth liver segmentation masks and a second component based on classification by the discriminator network of the predicted liver segmentation masks generated by the deep image-to-image network from the input training volumes, and wherein minimizing the second loss function decreases the segmentation loss calculated between the predicted liver segmentation masks and the ground truth liver segmentation mask and increases the probability of the discriminator network incorrectly classifying the predicted liver segmentation masks as positive.

5. The method of claim 4, wherein the deep image-to-image network is a deep encoder-decoder network having a plurality of encoder layers, a plurality of decoder layers, and a plurality of branches connected to corresponding decoder layers with each of the plurality of branches terminating in a respective output layer that matches a size of the input training volumes, and the second loss function calculates the segmentation loss as a weighted combination of respective binary voxel-wise cross entropy loss terms for all of the output layers of the plurality of branches and a final output layer of the deep image-to-image network.

6. The method of claim 2, wherein the deep image-to-image network is pre-trained based on the training volumes and corresponding ground truth liver segmentation maps prior to the adversarial network including the deep image-to-image network and the discriminator network being trained.

7. The method of claim 1, wherein the 3D medical image of the patient is a 3D computed tomography (CT) volume of the patient.

8. An apparatus for automated liver segmentation in a 3D medical image of a patient, comprising:
   means for receiving a 3D medical image of a patient;
   means for inputting the 3D medical image of the patient to a trained deep image-to-image network, wherein the trained deep image-to-image network is trained in an adversarial network together with a discriminative network based on a segmentation loss calculated as a voxel-wise cross entropy between predicted liver segmentation masks generated by the deep image-to-image network from input training volumes and ground truth liver segmentation masks, wherein the discriminative network distinguishes between the predicted liver segmentation masks and the ground truth liver segmentation masks; and
   means for generating, using the trained deep image-to-image network, a liver segmentation mask defining a segmented liver region in the 3D medical image of the patient.

9. The apparatus of claim 8, wherein the adversarial network including the deep image-to-image network and the discriminator network is trained by iteratively alternating discriminator network training based on a first loss function and deep image-to-image network training based on a second loss function for a plurality of iterations.

10. The apparatus of claim 9, wherein the discriminator network training updates weights of the discriminator network to minimize the first loss function having a first component based on classification by the discriminator network of the ground truth liver segmentation masks and a second component based on classification by the discriminator network of the predicted liver segmentation masks generated by the deep image-to-image network from the input training volumes, and wherein minimizing the first loss function increases a probability of the discriminator network correctly classifying the ground truth liver segmentation masks as positive and increases a probability of the discriminator network correctly classifying the predicted liver segmentation masks as negative.

11. The apparatus of claim 10, wherein the deep image-to-image network training updates weights of the deep image-to-image network to minimize the second loss function having a first component that calculates the segmentation loss between the predicted liver segmentation masks generated by the deep image-to-image network from the input training volumes and the ground truth liver segmentation masks and a second component based on classification by the discriminator network of the predicted liver segmentation masks generated by the deep image-to-image network from the input training volumes, and wherein minimizing the second loss function decreases the segmentation loss calculated between the predicted liver segmentation masks and the ground truth liver segmentation mask and increases the probability of the discriminator network incorrectly classifying the predicted liver segmentation masks as positive.

12. The apparatus of claim 11, wherein the deep image-to-image network is a deep encoder-decoder network having a plurality of encoder layers, a plurality of decoder layers, and a plurality of branches connected to corresponding decoder layers with each of the plurality of branches terminating in a respective output layer that matches a size of the input training volumes, and the second loss function calculates the segmentation loss as a weighted combination of respective binary voxel-wise cross entropy loss terms for all of the output layers of the plurality of branches and a final output layer of the deep image-to-image network.

13. The apparatus of claim 9, wherein the deep image-to-image network is pre-trained based on the training volumes and corresponding ground truth liver segmentation maps prior to the adversarial network including the deep image-to-image network and the discriminator network being trained.

14. A non-transitory computer readable medium storing computer program instructions for automated liver segmentation in a 3D medical image of a patient, the computer program instructions when executed by a processor cause the processor to perform operations comprising:
   receiving a 3D medical image of a patient;
   inputting the 3D medical image of the patient to a trained deep image-to-image network, wherein the trained deep image-to-image network is trained in an adversarial network together with a discriminative network based on a segmentation loss calculated as a voxel-wise cross entropy between predicted liver segmentation masks generated by the deep image-to-image network from input training volumes and ground truth liver segmentation masks, wherein the discriminative network distinguishes between the predicted liver segmentation masks and the ground truth liver segmentation masks; and
   generating, using the trained deep image-to-image network, a liver segmentation mask defining a segmented liver region in the 3D medical image of the patient.

15. The non-transitory computer readable medium of claim 14, wherein the adversarial network including the deep image-to-image network and the discriminator network is trained by iteratively alternating discriminator network training based on a first loss function and deep image-to-image network training based on a second loss function for a plurality of iterations.

16. The non-transitory computer readable medium of claim 15, wherein the discriminator network training updates weights of the discriminator network to minimize the first loss function having a first component based on classification by the discriminator network of the ground truth liver segmentation masks and a second component based on classification by the discriminator network of the predicted liver segmentation masks generated by the deep image-to-image network from the input training volumes, and wherein minimizing the first loss function increases a probability of the discriminator network correctly classifying the ground truth liver segmentation masks as positive and increases a probability of the discriminator network correctly classifying the predicted liver segmentation masks as negative.

17. The non-transitory computer readable medium of claim 16, wherein the deep image-to-image network training updates weights of the deep image-to-image network to minimize the second loss function having a first component that calculates the segmentation loss between the predicted liver segmentation masks generated by the deep image-to-image network from the input training volumes and the ground truth liver segmentation masks and a second component based on classification by the discriminator network of the predicted liver segmentation masks generated by the deep image-to-image network from the input training volumes, and wherein minimizing the second loss function decreases the segmentation loss calculated between the predicted liver segmentation masks and the ground truth liver segmentation mask and increases the probability of the discriminator network incorrectly classifying the predicted liver segmentation masks as positive.

18. The non-transitory computer readable medium of claim 17, wherein the deep image-to-image network is a deep encoder-decoder network having a plurality of encoder layers, a plurality of decoder layers, and a plurality of branches connected to corresponding decoder layers with each of the plurality of branches terminating in a respective output layer that matches a size of the input training volumes, and the second loss function calculates the segmentation loss as a weighted combination of respective binary voxel-wise cross entropy loss terms for all of the output layers of the plurality of branches and a final output layer of the deep image-to-image network.

19. The non-transitory computer readable medium of claim 15, wherein the deep image-to-image network is pre-trained based on the training volumes and corresponding ground truth liver segmentation maps prior to the adversarial network including the deep image-to-image network and the discriminator network being trained.

* * * * *